United States Patent [19]

Marek et al.

[11] 3,921,307

[45] Nov. 25, 1975

[54] FLUIDIZED BED APPARATUS AND METHODS

[75] Inventors: Jiri Frantisek Marek, Kotara; Bruce Ronald Evans, North Lambton; Thomas George Callcott, Mayfield, all of Australia

[73] Assignee: The Broken Hill Proprietary Company Limited, Melbourne, Australia

[22] Filed: Dec. 29, 1972

[21] Appl. No.: 317,765

[52] U.S. Cl. .................. 34/10; 34/57 A; 34/57 C; 165/104; 432/15; 432/58
[51] Int. Cl.² ...................... F26B 3/08; F27B 15/00
[58] Field of Search .......... 34/10, 57 A, 57 C, 57 R; 432/15, 58; 165/104

[56] References Cited
UNITED STATES PATENTS

| | | | |
|---|---|---|---|
| 2,797,908 | 7/1957 | Zubrzycki | 34/57 A |
| 2,872,386 | 2/1959 | Aspegren | 165/104 |

*Primary Examiner*—John J. Camby
*Attorney, Agent, or Firm*—Cushman, Darby & Cushman

[57] ABSTRACT

This specification discloses a carboniser for coal compacts comprising a treatment channel containing a bed of particulate carrier which is fluidized intermittently or continuously by means of fluid distributor pipes arranged near the bottom of the channel. The channel has a feed section, a treatment section and a discharge section and is connected with a reheater for the carrier. The carrier is transferred between the channel and the reheater by means of downcomers and carrier lifters, the introduction of carrier being near the bottom of the channel and its removal being near the top of the bed so that the carrier passes upwardly through the channel in a direction which is transverse to the direction of transport of the compacts and carrier. When the compacts and some carrier are discharged from the treatment channel, the carrier is separated from the compacts and returned to the feed section. The specification also describes a special feed section arrangement which reduces emission of pollutants at the point of introduction of the compacts to the treatment channel.

18 Claims, 7 Drawing Figures

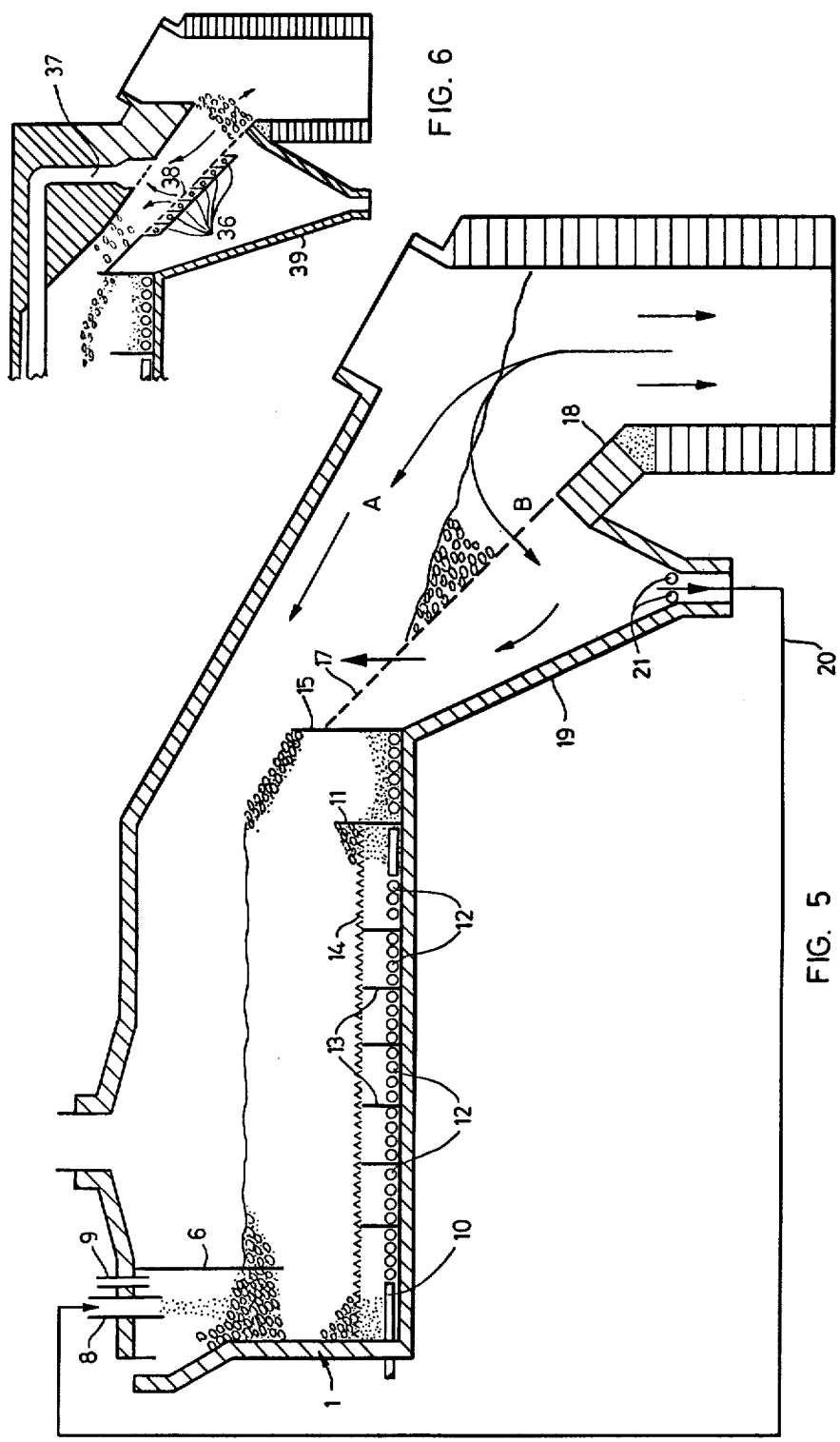

FLUIDIZED BED APPARATUS AND METHODS

FIELD OF THE INVENTION

This invention relates to impoved fluidized bed apparatus and methods for carrying out reactions involving a particulate material capable of being fluidized, another material or materials in lump form immersed in the particulate material, and one or more fluids. The bed of particulate material is fluidized, either intermittently or continuously, by the discharge into the bed at a sufficient rate of at least one of the fluids.

The particulate material, which is involved physically and possibly chemically in the reaction, also serves to transport the lump material through the treatment apparatus, and is hereinafter referred to as the carrier.

BACKGROUND OF THE INVENTION

One important practical application for the invention is in the carbonisation of coal compacts. In this specification, the term coal compacts includes briquettes, pellets, extruded shapes or balls of crushed coal or coal blends, or lumps of coal. The compacts constitute the lump material referred to earlier, and the word compacts will be used hereinafter to describe the lump material or materials imvolved in the reaction. As is well known, coal compacts during carbonisation pass through a plastic condition as their temperature is raised. The "plastic range" is commonly between 350°C and 550°C. By carbonising the compacts in a bed of carrier such as sand, distortion and coalescence of the compacts is avoided. For reasons of economy, the heating of the compacts in a bed of carrier is usually limited to giving them a rigid, non-adhesive, semi-coked shell. Further carbonisation, if required, is then carried out more economically in conventional equipment such as a shaft furnace.

Carbonisers using a bed of hot carrier, such as sand, are known, but at present suffer a number of disadvantages. Firstly, they lack control in the treatment of the compacts, resulting in variations in the quality of the product in spite of a uniform feed. Secondly, they are not able to produce some treatment regimes that appear to be desirable from theoretical and laboratory studies. Thirdly, and largely as a consequence of the foregoing, present carboniers are large and expensive in relation to their throughput capacity.

Hence, an object of the invention is to provide improved apparatus and methods that are largely free of these disadvantages.

SUMMARY OF THE INVENTION

According to one aspect, the invention provides fluidized bed apparatus comprising a treatment channel adapted to contain a bed of particulate carrier, means at one end of the treatment channel for feeding compacts into the bed of carrier, means for fluidising the bed of carrier in such a manner as will result in the transport of carrier and compacts to the other end of the treatment channel, a plurality of transfer means of two types disposed along the treatment channel, one type being for the removal of carrier from the channel and the other type being for the return of carrier to the treatment channel, a reheater, for changing the temperature of the carrier removed from the treatment channel prior to its return to the treatment channel, and means at the other end of the treatment channel for discharging compacts and/or carrier from the treatment channel.

The transfer means for the return of the carrier to the treatment channel may include a passage which has its carrier material outlet opening into the treatment channel at or near its base or floor while the transfer means for the removal of the carrier includes a passage which has its carrier material inlet opening to the channel just below the top of the bed, such that the reheated carrier passes through the channel in a direction which is transverse to the direction of transport of compacts and carrier in the channel to facilitate maximum contact between reheated carrier and compacts and also maximum admixture with the carrier in the bed.

The removal from and return of carrier to the treatment channel at a plurality of positions along its length has the important advantage that any one of a very wide range of temperature profiles, i.e., variations in temperature of the carrier along the length of the treatment channel, can be established. By combining a selected temperature profile with a selected residence time, any one of a wide range of time/temperature treatment regimes can be established.

Selection of residence time is achieved by appropriate selection of variables that include, for example, the intermittent fluidisation program and the feed rate of compacts.

Preferably the two types of transfer means alternate along the full length of the reheater and at least along a substantial portion of the length of the treatment channel. Preferably also, the transfer means serve as a partition dividing the treatment channel from the reheater, where the treatment channel and reheater are arranged side by side. However, where the reheater is located in another position, the transfer means are formed in or on a side wall of the treatment channel.

According to another aspect, the invention provides a method for reacting a carrier material, compacts, and a fluid or fluids comprising feeding the compacts into one end of a bed of carrier material fluidized continuously or intermittently by at least one of the fluids and maintained at a predetermined temperature or temperatures varying along the length of the bed, removing carrier from the bed at a plurality of positions along the length of the bed, changing the temperature of removal carrier, returning the carrier to the bed at a plurality of positions along the length of the bed, and discharging the compacts from the other end of the bed.

The carrier may be removed from the bed at a position just below the top of the bed whereas the carrier is returned at a position near the base or floor of the bed such that returned carrier passes through the bed in a direction which is transverse to the direction of transport of the carrier and compacts in the bed to facilitate maximum contact between the returned carrier and the compacts and also maximum admixture with the carrier in the bed.

The carrier may be any particulate material that is capable of being fluidized under the conditions prevailing in the bed in the treatment channel. Examples include silica sand, alumina sand, iron oxides of various types, and beach sands such as ilmenite, zircon and rutile.

In the carbonisation of coal compacts, silica sand, especially when fine and pure, is a preferred carrier, being low in cost, readily available, and inert. When appropriately fluidized, the effective density of the bed can be made to result in a desirable floating of the compacts in the bed.

BRIEF DESCRIPTION OF THE DRAWINGS

In the drawings:

FIG. 5 is a generally schematic longitudinal cross-sectional elevation of the treatment channel showing the discharge arrangement and the entrance to the shaft furnace;

FIG. 6 is a view similar to FIG. 5 showing an alternative discharge arrangement.

DESCRIPTION OF PREFERRED EMBODIMENTS

Figure 1:
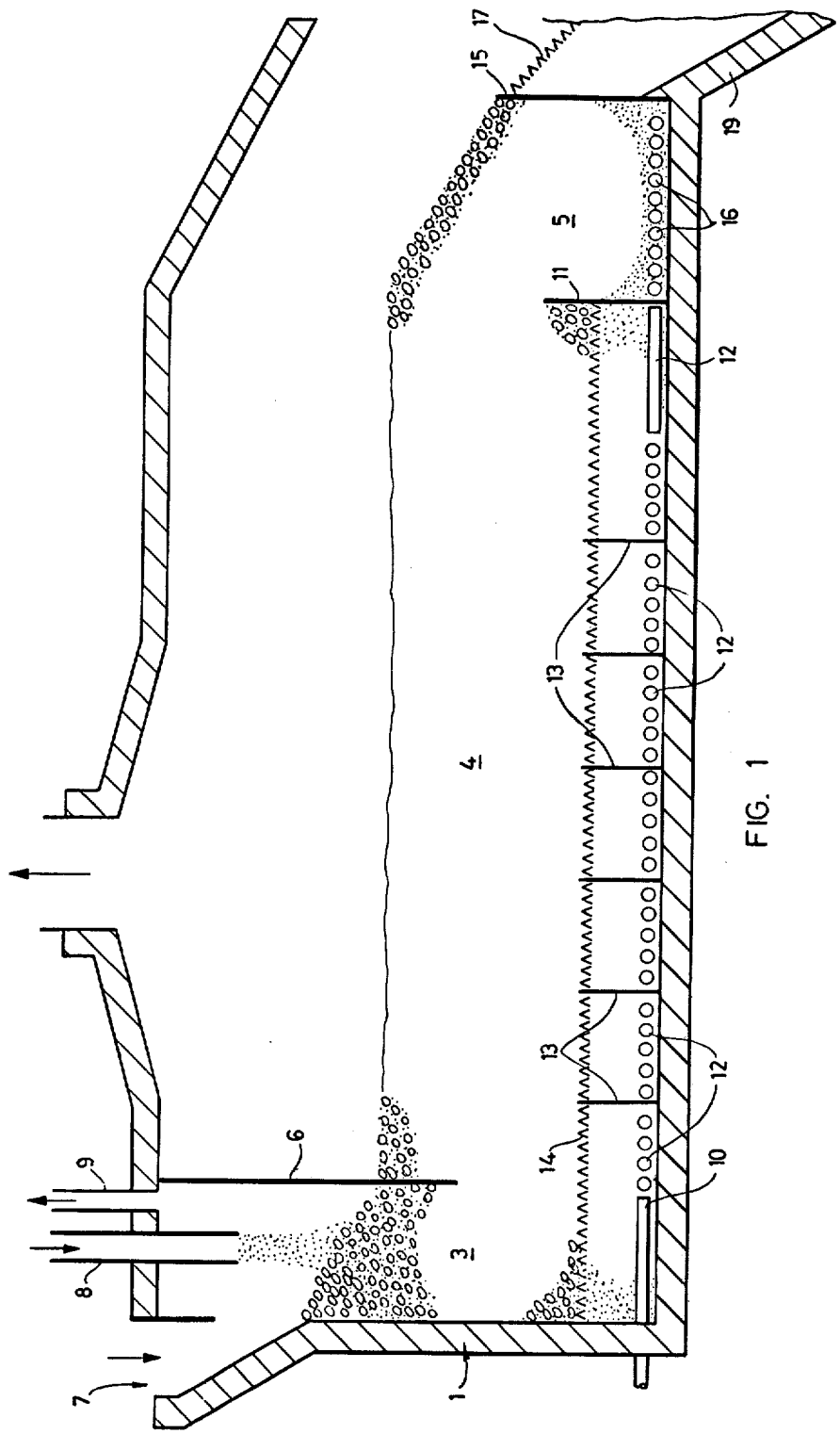
FIG. 1 is a generally schematic longitudinal cross-sectional elevation of the treatment channel of a carboniser embodying the invention.

The carboniser shown in the drawings, particularly FIGS. 1 and 2, will be seen to comprise a treatment channel 1 adapted to contain a bed of particulate carrier, such as silica sand, and a reheater 2 (FIG. 2) for heating the carrier transferred from the channel 1, the reheater 2 being divided from the channel 1 by means (described below) for transferring the carrier from the channel 1 to the reheater 2 and vice versa.

The treatment channel 1 can be conveniently considered as comprising a feed section 3, a treatment section 4 and a discharge section 5. The feed section 3 is a small compartment divided from the treatment section 4 by a baffle 6 extending from the roof of the carboniser and extending to a position which is normally below the level of the bed in the channel 1 to operate as a gas lock between sections 3 and 4. A compacts feed opening 7, a carrier make-up inlet 8 and a vent opening 9 are provided in the roof of the feed section 3. The carrier make-up is derived from the discharge separator to be described in relation to FIG. 5 of the drawings.

The feed section 3 is fluidized by a plurality of fluid distributor pipes 10, arranged as shown for manufacturing convenience, adjacent the floor of the channel 1. The pipes 10 are fed with a suitable fluidizing medium such as steam. Flue gas, carboniser gas, natural gas or any other substantially non-oxidising gas may alternatively be used. The temperature of the steam is not important because its heat content is small compared to the carrier but its temperature should be above the dew point to prevent condensation problems. The average bed temperature in the feed section is of the order of 250° to 700°C depending on the coal and/or binder used in the compacts. The lower and upper temperature limits are not critical.

The treatment section 4 extends between the baffle 6 and a baffle 11 extending from the floor of the channel 1 to such a height as to slightly arrest the flow of carrier and compacts into the discharge section 5. A grating 14 extends between the end wall of the channel 1 in the feed section to the baffle 11 and defines the effective treatment depth of the bed of carrier. The treatment section 4 is fluidized by a plurality of fluid distributor pipes 12 arranged across the floor of the channel 1. The pipes 12 are arranged in groups which are divided by baffles 13 extending from the floor to the height of the grating 14 which baffles prevent horizontal transport of the carrier below the grating 14. The groups of pipes 12 are related to the carrier transfer means as will be described further below.

The overall depth of the bed in the treatment section 4 is about 1.5 to 2.1 metres, the depth of the effective treatment section being about 0.6 to 0.9 metres.

The discharge section 5 extends between the baffle 11 and an end wall 15 defining a weir over which the compacts and a small proportion of the carrier, say one part by weight of campacts to three parts by weight of carrier, are discharged to a separating section (described below). For this purpose the weir 15 is lower than the height of the bed in the treatment section 4. The discharge section 5 is fluidised by fluid distributor pipes 16 arranged across the floor of the channel 1 in a similar manner to pipes 12.

The separating section (FIG. 5) following the weir 15 comprises a grate 17 extending from the weir 15 to the mouth 18 of a shaft furnace adapted to further treat the compacts. The shaft furnace may be of any suitable type capable of further carbonising the compacts, if required. As the carrier and compacts flow over the weir 15 during the fluidized periods of section 5, the carrier passes through the grate into a collection chute 19 while the compacts proceed down the grate and into the mouth of the furnace. The carrier collected in the chute 19 is returned to the feed section through a pneumatic transfer line 20 connected to make-up inlet 8. Two fluid distrubutor members 21 are positioned adjacent the outlet of the chute 19 to fluidize the carrier at this point and ensure smooth flow.

The gas issuing from the mouth 18 of the shaft furnace is divided into two streams A and B by the back pressure, stream A passing into the treatment channel 1. The second stream B passes through the lower part of grate 17 blowing carrier off the compacts and a small proportion passes up through the grate to loosen the carrier and compacts while some carrier is blown back into the channel 1.

Figure 2:
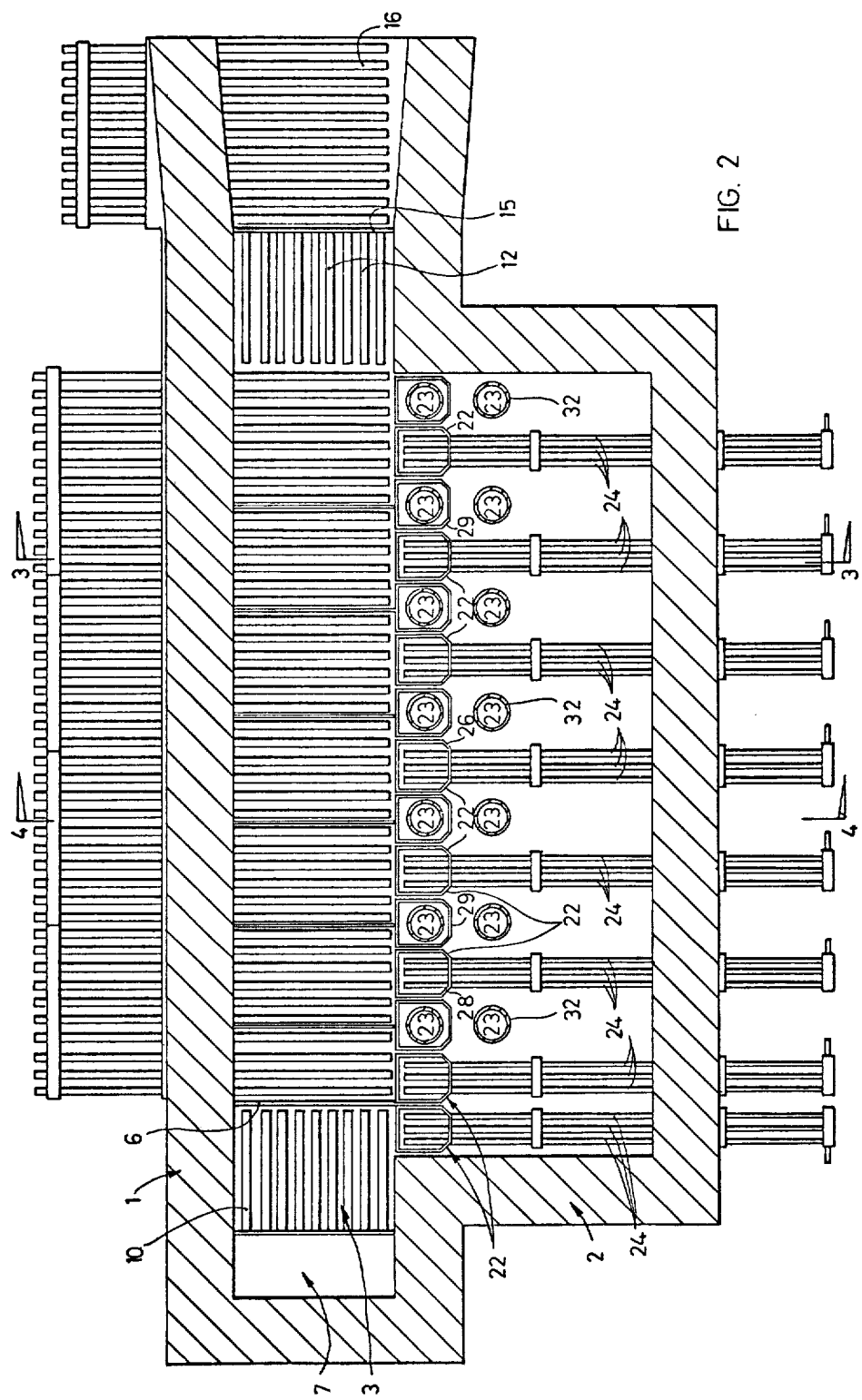
FIG. 2 is a generally schematic sectional plan view of the carboniser with the reheater and treatment channel side by side.
Figure 3:
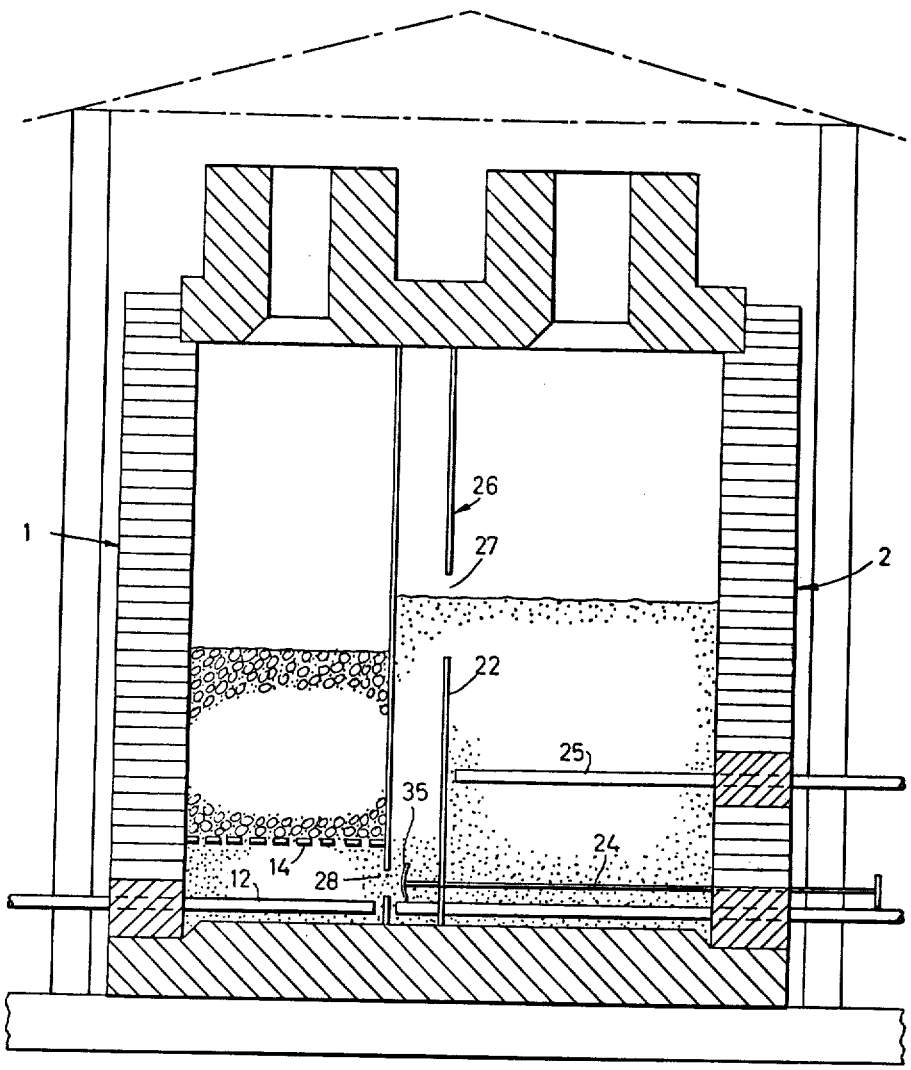
FIGS. 3 and 4 are sectional end elevations taken along lines 3-3 and 4—4 respectively of FIG. 2.
Figure 4:
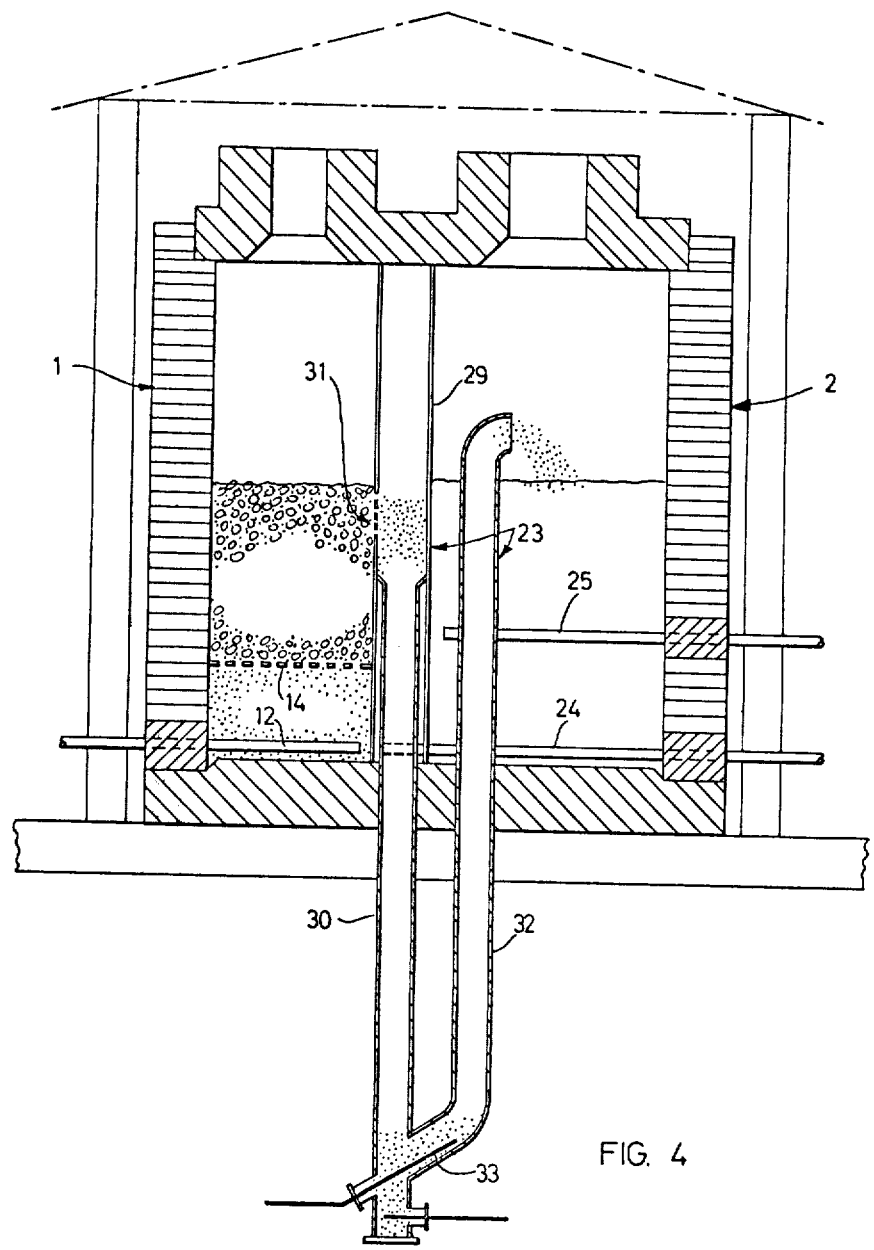

Referring now to FIGS. 2 to 4 of the drawings, the means for tranferring the carrier from channel 1 to reheater 2 will now be described in detail. As will be clear from FIG. 2 the various transfer means divide the channel 1 from the reheater and comprise a plurality of carrier downcomers 22 and a plurality of downcomer-lifters 23 alternating with the downcomers 22 in the treatment section 4. The carrier in reheater 2 is heated by fluidized bed combustion to a temperature of about 650°C to 900°C, depending on the temperature required in the channel 1. Fluidization of the carrier in the reheater is achieved by fluid, such as preheated air, introduced by distributor pipes 24, near the floor of the reheater 2, and pipes 25 about halfway up the bed in the reheater 2.

Two sources of fuel may be used for the fluidised bed combustion; (i) coal debris from the compacts which is introduced with sand from the carboniser,(ii) fuel gas which is introduced through distributors 24 and/or 25 to supply the balance of the heat required above that supplied by the debris. The use of carboniser gas is preferred although other gases such as LPG or natural gas can of course be used.

Good burning efficiency is possible under these conditions even when operating with small excess of air.

In an alternative arrangement not shown, external burners, supplied with fuel and air, discharge products of combustion through a flue immersed in the bed.

The burners may be used only during starting up to raise the temperature of the bed above the ignition temperature of the fuel gas discharged through distributors.

Referring now to FIGS. 2 and 3, the carrier downcomers 22 comprise vertically extending rectangular section tubes 26 arranged between the floor (common) of the channel 1 and reheater 2 to the roof (common) of the channel and reheater. Each pipe 26 has an upper opening 27 in the wall thereof facing the reheater 2 and a lower opening 28, adjacent the floor, and below the grating 14 in the wall thereof facing the channel 1. It will be seen from FIG. 2 that the distributors 24 are arranged in groups of three in alignment with the downcomers 22 and their tips extend into the tubes 26 below the level of the opening 28. Thus, the carrier in the downcomer is completely fluidized at all times. Alternatively, separate fluidisers can be used for the downcomers 22 and these are activated at the same time as fluidisers 12 or for part of that period.

The downcomer in lifters 23 (FIGS. 2 and 4) comprise similar tubes 29 to which a downcomer pipe 30 is connected and extends through the floor of the structure. The tube 29 has a single opening 31, covered by a grate, in the wall thereof facing the channel 1. The pipe 30 has a lifter pipe 32 branching therefrom and extending up through the floor through the bed in the reheater 2 and terminating in a discharge outlet above the bed. The carrier in the pipes 30 and 32 are fluidised by a fluid distributor 33 extending into both pipes and a further distributor 34 in the bottom of pipe 30.

Since the level of carrier bed in the reheater is always slightly higher than the bed in the treatment channel (for an average bed depth of 1.59 m in channel 1, the average depth in reheater 2 is 1.73 m), hot carrier from the reheater will pass through opening 27, down the tube 26 and out opening 28 into the bed in channel 1 during the fluidisation periods thereof. Control of hot carrier transfer through any one or more of the downcomers 22 may be achieved by a valve 35 adapted to throttle or close the opening 28. Since the bed in channel 1 is fluidised, the reheated carrier will be thoroughly admixed with the resident carrier before coming into contact with the compacts above grating 14 thus avoiding thermal shock. Similarly, during fluidisation periods of the bed in channel 1, carrier in the bed will, due to the addition of carrier near the base of the channel 1, flow into the opening 31 in tube 29 and pass down through tubes 30 and up tube 32 in a fluidised state to return to the reheater. It will be evident that due to the introduction of the reheated carrier near the floor of channel and the removal of carrier from the top of the bed, the carrier passes upwardly in a direction generally transverse to the direction of flow of the compacts and carrier in the channel 1. This ensures maximum contact between the hot carrier and the compacts and facilitates complete admixture between the reheated carrier and the resident carrier. As a result, the ratio of sand to compacts can be kept smaller than in prior art devices which add the reheated carrier and the feed section or on the top of the bed midway between is ends.

The operation of the preferred carboniser is as follows. Assuming that the channel 1 and reheater are full of sand at the required temperatures, compacts are delivered to the feed section 3 through opening 7 by any suitable means such as a belt conveyor. As mentioned, the temperature of sand in this section is between 250°C and 700°C depending on the compacts to be treated, the temperature being maintained by the addition of hot carrier from the reheater 2 by means of a single downcomer 22. The ratio of make-up carrier at just below the temperature of the carrier in the treatment section and reheated sand at between 650°C and 900°C is controlled by the valve 35 of the single downcomer 22 and/or by controlling the fluidisation periods of section 3.

The compacts and carrier in the feed secion 3 are transferred by simultaneously fluidising sections 3 and 4. The temperature of section 4 is maintained at between 400°C and 700°C depending on the compacts, a typical temperature for coal compacts being 500°C, again by operation of valves 35 and/or control of the fluidisation periods of the bed in channel 1.

The residence time of the compacts in the treatment section 4 is determined by the temperature of the bed, the fluidisation program for the bed, the feed rate of the compacts, the carrier return rate to the feed section and the carrier compact ratio. Naturally these parameters are selected to give the desired degree of carbonisation of the compacts.

The carrier and compacts progress through the bed during the intermittent fluidisation program thereof being subjected to a relatively constant temperature throughout the length of the section 4 or to a predetermined temperature profile or series of temperature zones created by suitably controlling the fluidisation of the downcomers 22 in conjunction with the fluidisation of the treatment section and by controlling the valves 35. The creation of a profile or zones of different temperatures is assisted by the baffles 13 in channel 1 inhibiting horizontal flow of the hot carrier introduced by each downcomer 22.

The discharge section 5 is also fluidised intermittently, usually when the treatment section 4 is not fluidised. However, the fluidisation times can be overlapped to any desired extent. During its fluidised periods, carrier and compacts are forced into section 5, the pile assuming its natural angle of repose as shown. Then when the section 5 is fluidised, the carrier and compacts are levelled and flow over weir 15 to the separation section where they are separated as described and the compacts delivered to the shaft furnace mouth 18. Further treatment is then performed as desired and the carrier is returned to the feed section 3 as described.

Steam is used as the fluidising medium in all cases except for the dowmcomers where compressed air may be used instead. In the case of the lifter tube 32, steam is supplied to 33 at the required flow rate and pressures to achieve the necessary lifting of the carrier through the tube 32. The lifter is generally fluidised continuously.

the following process variables were observed during tests carried out in an apparatus embodying the invention: (a) feed section: steam flow of 180 kg/h at 50 K Pa and 420°C. (b) treatment: steam flow of 580 kg/h at 50 K PA and 420°C. (c) discharge section: steam flow of 150 kg/h at 50 k Pa and 420°C. (d) reheater sand lifters: total steam flow for fluidisation and lifting of 195 kg/h at 50 k Pa and 420°C. (e) downcomers: compressed air at 140 k Pa for each downcomer (flow not measured), e.g. 0.5 m³/h. (f) discharge sand lifters: carboniser gas at 60 k Pa for each of four lifters (flow not measured), e.g. 80 m³/h. (g) coal compacts feed rate 3.3 tonnes/h. (h) average bed depths; 1.59 m in channel 1 and 1.73 m in reheater 2. (i) for bed dimensions: carboniser (feed, treatment and discharge sections). 0.91 m wide, 5.79 m long and 2.74 m high. reheater: 1.22 m wide, 4.57 m long and 2.74 m high (approximate). (j) reheater: air flow of 2000 m³/h at 28 k Pa and 200°C. LPG flow zero as coal breeze was present in the reheater in sufficient quantities to maintain temperatures. Maximum LPG flow rate is 65 m³/h at 140 k Pa and ambient temperature.

Average temperature in the feed section was 335°C, in the treatment section 450°C, in the discharge section 474°C and in the reheater 760°C.

The separation section construction as shown in FIG. 5 may be modified by the arrangement of fluidiser means above or just below the grate 17 to assist in the separation of the carrier from the compacts. A further alternative is shown in FIG. 6. In this arrangement, a gas or steam supplied through distributors 36 fluidises carrier, which is then entrained by gas from the shaft furnace and carried through pipe 37 to the channel 1. Other carrier falls through the grate 38 into the chute 39 and is returned to the feed section of the channel as in FIG. 5.

Figure 7:
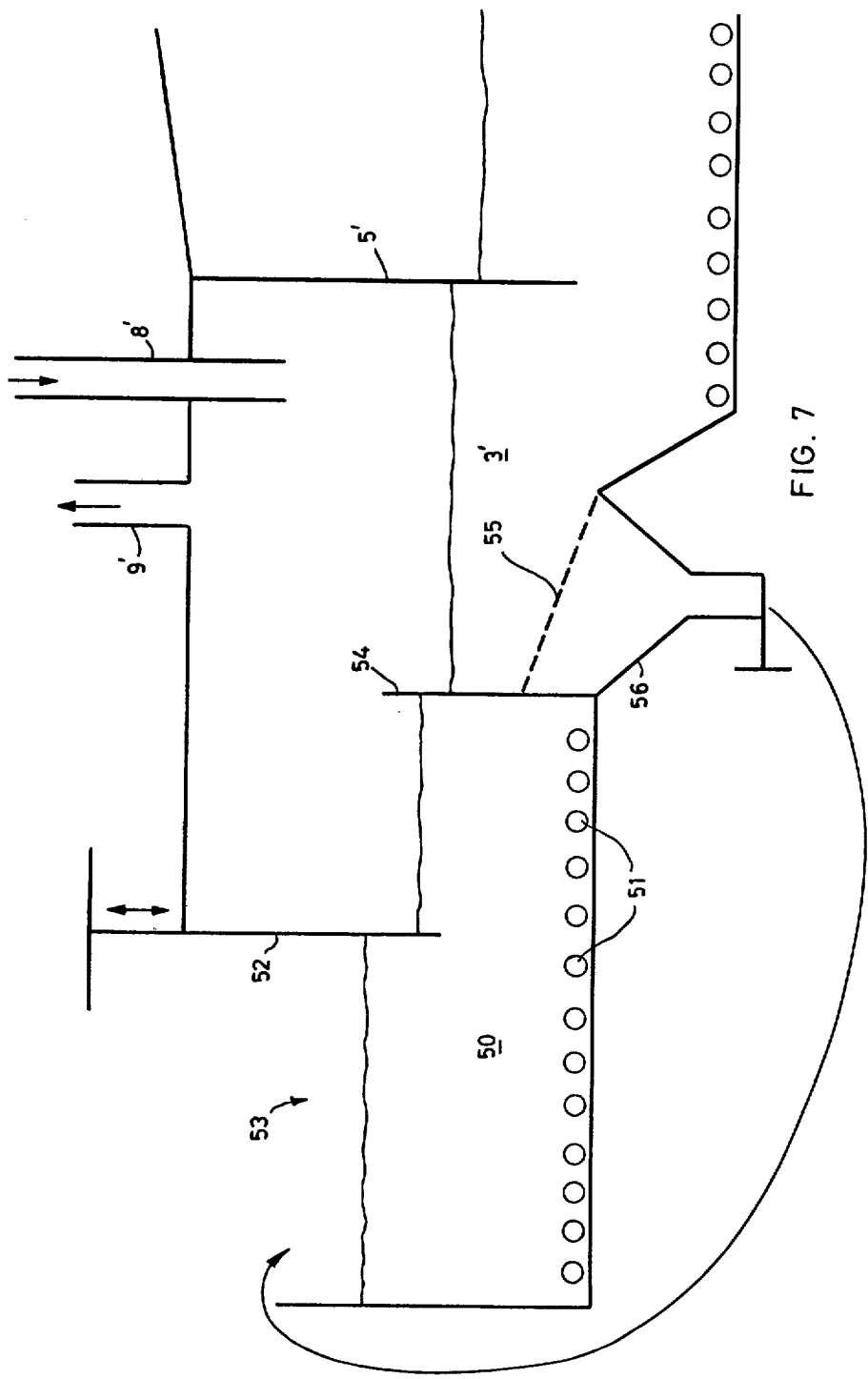
FIG. 7 is a schematic longitudinal elevation similar to FIG. 1 showing an alternative form of feed section for the treatment channel.

An alternative form of feed section is shown schematically in FIG. 7. It will be seen that there is an additional and separate feed section 50 connected to a feed section 3' corresponding to feed section 3 of the main embodiment. In section 3' there is a hot sand feed opening 8' corresponding to 8 and a volatiles vent 9' corresponding to 9. The baffle 6' corresponds to baffle 6 and the remainder of the treatment section is the same as for the first embodiment.

The additional feed section is characterised by a fluidised bed of cool carrier, that is, carrier at a temperature much lower than the temperature in feed section 3' and the treatment section and also below a temperature at which volatiles are released from the compacts. The bed is fluidised as in the previous embodiment by fluid distributor pipes 51 arranged across the floor of section 50. A vertically adjustable baffle 52 separates the compacts and carrier feed opening 53 to the section 50 from section 3' to prevent any volatiles from this section escaping. When the bed in section 50 is fluidised and the carrier-compacts level before baffle 52 is higher than the weir 54 at the end of section 50, compacts and sand will overflow into feed section 3'.

Feed section is provided with a carrier separation grate above a collection chute which collects most of the cool carrier from section 50 whereupon it is fed back thereto as shown.

The main advantage of the alternative feed section is that there is no escape of polluting volatiles from the compacts feed opening so for this reason it is preferred to the feed section arrangement of the first embodiment.

It will be appreciated that while one treatment channel fed by one reheater has been described, two or more channels may be fed by one or more reheaters. Several spatial arrangements of treatment channels and reheaters are possible. For example, the treatment channels may be in spaced parallel relationship with reheaters occupying the spaces between treatment channels. Alternatively, the treatment channels may be closer together and the reheaters may be located above the space between adjacent channels.

When the invention is used for the carbonisation of coal compacts, the treated material is usually a semicoke which may be regarded either as a product in its own right, e.g. a smokeless fuel, or as a feed material for further treatment, for example, high temperature carbonisation resulting in the production of coke. Another potential application for the invention is the production of a material suitable as a blast furnace feed comprising pellets of at least partially reduced iron ore and coke from compacts of iron ore and coal.

The invention also has general application in the drying of lump materials, and especially for food stuffs where gentle drying is required.

We claim:

1. A fluidised bed apparatus comprising a generally horizontal treatment channel adapted to contain a bed of particulate carrier means at one end of the treatment channel for feeding compacts into the bed of carrier, means for fluidising the bed of carrier in such a manner as will result in the transport of carrier and compacts to the other end of the treatment channel, a plurality of transfer means of two types disposed along the treatment channel one type being for the removal of carrier from the channel and the other type being for the return of carrier to the treatment channel, a device for changing the temperature of the carrier removed from the treatment channel prior to its return to the treatment channel, said transfer means of said one type including a passage connected to the temperature changing device and having an outlet opening into the treatment channel at or near the base or floor thereof while the transfer means of said other type includes a passage having its inlet opening to the channel just below the top of the bed, whereby the carrier from the temperature changing device passes upwardly through the channel in a direction which is transverse to the direction of transport of the compacts and carrier, and means at said other end of the treatment channel for discharging compacts and/or carrier from the treatment channel.

2. A fluidised bed apparatus according to claim 1 wherein said transfer means are arranged along the length of the channel and one type alternates with the other type.

3. A fluidised bed apparatus according to claim 2, further comprising a control valve arranged to close or throttle said outlet opening of each transfer means of said one type.

4. A fluidised bed apparatus according to claim 1, wherein the fluidising means are arranged near the floor of the channel and a grating device is positioned above the floor to create a compacts free zone of carrier which extends to a level above the outlet openings in said one type of transfer means.

5. A fluidised bed apparatus according to claim 4, further comprising baffles extending across the channel between adjacent transfer means of said one type to restrict the horizontal flow of reheated carrier in said compacts free zone.

6. A fluidised bed apparatus according to claim 1, wherein each transfer means of said one type comprises a downcomer passage having an opening to said temperature changing device and a fluidising means in said passage just below said outlet opening to said channel, each transfer means to said other type includes a downcomer passage having said opening to said channel, and fluidised carrier lifter passage for transporting said carrier to said reheater.

7. A fluidised bed apparatus according to claim 1, wherein said treatment channel and temperature changing device are part of a single structure and said transfer means are formed in or define a wall means separating the treatment channel from said device.

8. A fluidised bed apparatus according to claim 1, wherein the feeding end of the treatment channel is separated from the remainder of the channel by a baffle which extends to a position below the surface of the bed.

9. A fluidised bed apparatus according to claim 8, wherein said baffle is preceded by a separate feeding section comprising a fluidized bed of carrier maintained at a low temperature, a weir at that end of the bed closest to said baffle, and a further baffle between the weir and the feeding opening of the section extending below the surface of the bed.

10. A fluidised bed apparatus according to claim 9, further comprising a carrier separation means adjacent the weir in said treatment channel and means for returning the separated low temperature carrier to the fluidized bed of said separate section.

11. A fluidised bed apparatus according to claim 1, wherein said other type of transfer means opens to the treatment channel at or near the floor thereof and the reheated carrier is admixed with the resident carrier near the floor of the channel, and below the level of compacts in the channel.

12. A method for physically reacting a carrier material, compacts, and a fluid or fluids comprising feeding the compacts into one end of a bed of carrier material, fluidizing the bed continuously or intermittently by at least one of the fluids and maintaining the bed at a predetermined temperature or temperatures varying along the length of the bed, removing carrier from the bed at a plurality of positions along the length of the bed at a location just below the top of the bed, changing the temperature of the removed carrier, returning the removed carrier to the bed at a plurality of positions along the length of the bed at a location at or near the bottom of the bed so that the returned carrier passes upwardly through the bed in a direction transverse to the direction of transport of the carrier and compacts in the bed, and discharging the compacts from the other end of the bed.

13. A method for reacting a carrier material, compacts, and fluid or fluids according to claim 12, wherein the plurality of positions at which the carrier is removed and returned alternate along the length of the bed.

14. A method for reacting a carrier material, compacts, and a fluid or fluids according to claim 13, further comprising controlling the return of carrier at on or more of said positions to create a desired temperature profile or desired temperature zones in the bed.

15. A method for reacting a carrier material, compacts, and a fluid or fluids according to claim 14, wherein return of the carrier is controlled by intermittently fluidizing the respective parts of the bed.

16. A method for reacting a carrier material, compacts, and a fluid or fluids according to claim 12, further comprising substantially preventing the emission of pollutants at the point of introduction of said compacts to the bed by creating a separate feeding zone where the temperature of the carrier is kept low and forming a gas lock between this feeding zone and the rest of the bed.

17. A method for reacting a carrier material, compacts, and a fluid or fluids according to claim 12, wherein the carrier is returned to the bed at or near the bottom thereof and is admixed with the resident carrier near the bottom of the bed and below the level of the compacts in the channel.

18. A method for physically reacting a carrier material, compacts, and a fluid or fluids comprising feeding the compacts into one end of a bed of carrier material, fluidising the bed continuously or intermittently by at least one of the fluids and maintaining the bed at a predetermined temperature or temperatures varying along the length of the bed, removing carrier from the bed at a plurality of positions along the length of the bed at a location just below the top of the bed, changing the temperature of the removed carrier, returning the removed carrier to the bed at a plurality of positions along the length of the bed at a location at or near the bottom of the bed so that the returned carrier passes upwardly through the bed in a direction transverse to the direction of transport of the carrier and compacts in the bed, and discharging the compacts from the other end of the bed.

* * * * *